Nov. 13, 1956 W. S. EDSALL 2,770,757
ARRANGEMENTS FOR THE PROTECTION OF CABLES AGAINST
SHORT-CIRCUIT CURRENTS AND AGAINST OVERLOADING
Filed March 13, 1953 2 Sheets-Sheet 2
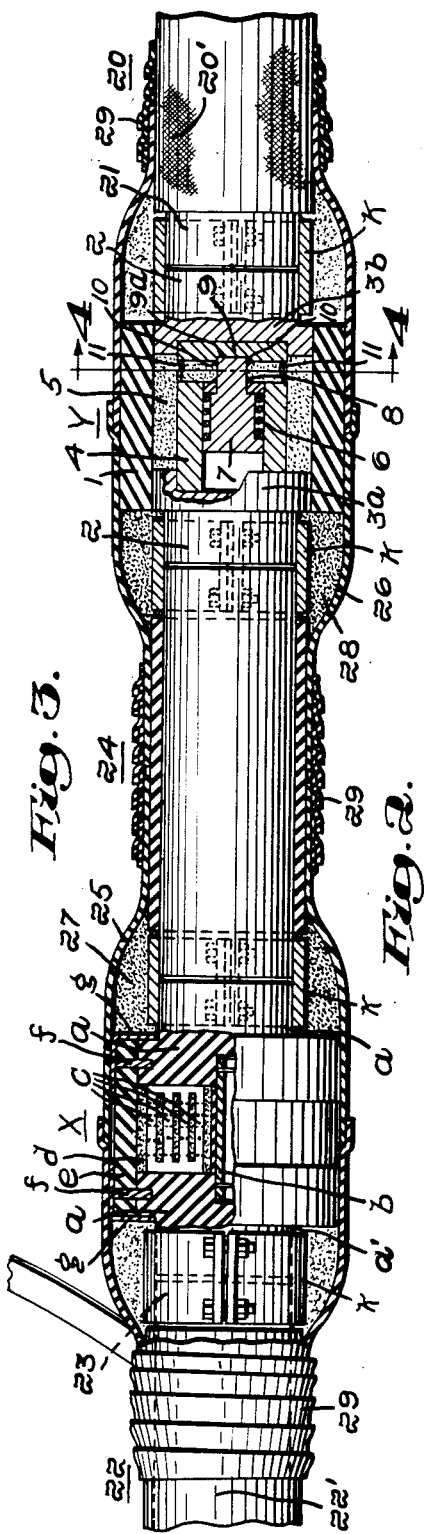
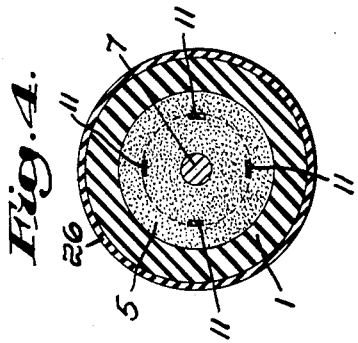
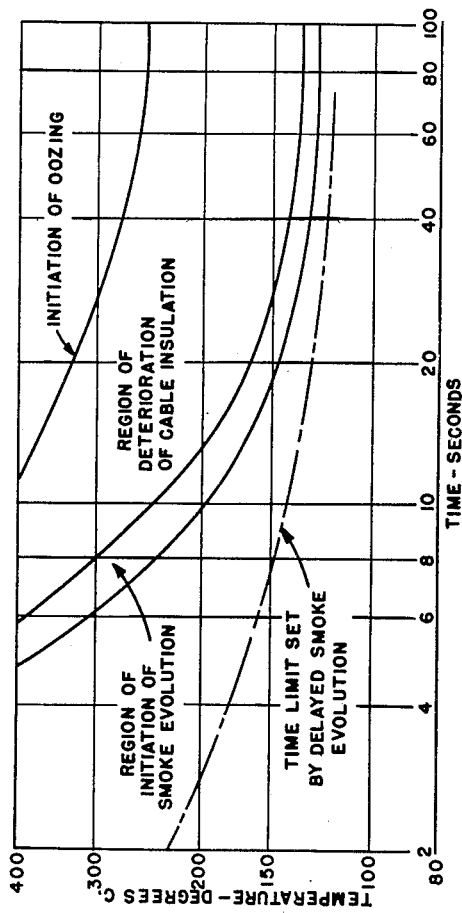
Inventor:
William S. Edsall,
by [signature]
Attorney even in case of overloads of long duration of cables no smoking of the cables occurs, and which permits therefore to utilize the current carrying capability of a cable to such an extent as has been impossible with prior art protective devices including prior art protective devices of the type described in the above-mentioned co-pending patent applications of W. S. Edsall et al.

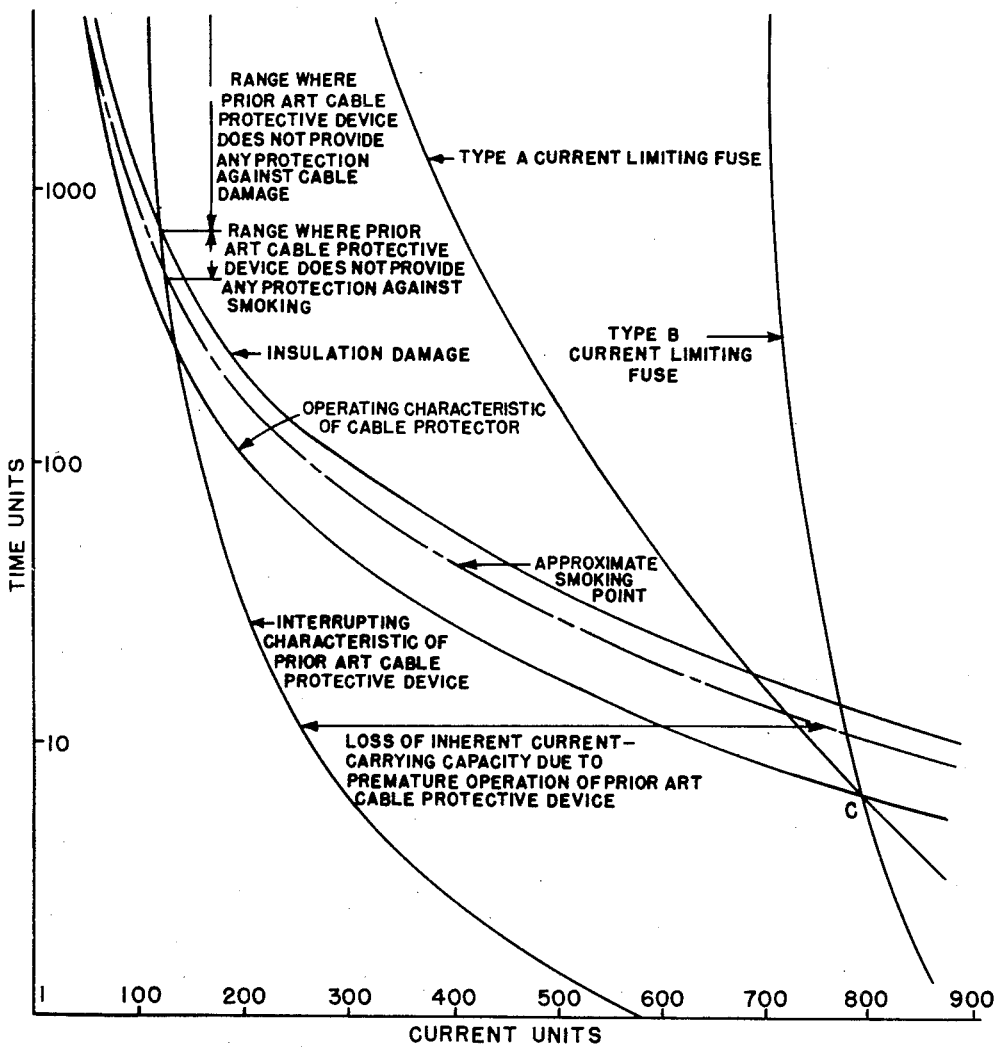

2,770,757

ARRANGEMENTS FOR THE PROTECTION OF CABLES AGAINST SHORT-CIRCUIT CURRENTS AND AGAINST OVERLOADING

William S. Edsall, Boston, Mass., assignor to The Chase-Shawmut Company, Newburyport, Mass.

Application March 13, 1953, Serial No. 342,113

8 Claims. (Cl. 317—40)

This invention relates to protection against overloading of electrical conductors which are insulated by an organic insulating material and to protection against the effects of currents of short-circuit current proportions upon such conductors.

Related inventions have been disclosed in the co-pending patent applications of W. S. Edsall et al.; Serial No. 222,658; filed April 24, 1951, for Thermal Protector for Conductor Insulation now U. S. Patent 2,645,690 and W. S. Edsall; Ser. No. 317,518; filed October 29, 1952, for Improvements in Cable Protection.

Heating of the metallic current carrying core of a conductor by overload currents and by short-circuit currents may impair the organic insulating material of which the covering enveloping the core of the conductor is made. Such impairment may consist either in immediate deterioration of the dielectric properties of the organic insulating covering of the conductor, or in a reduction of the useful life thereof.

It is one object of this invention to provide an improved system of cable protection against the dangers inherent in, and resulting from, both overloads of excessive duration and fault currents of short-circuit current proportions.

The requirements imposed upon a protective device which is intended for short-circuit current protection of cables and those imposed upon a protective device intended for overload current protection of cables are fundamentally incompatible, and all dual purpose protective devices, i. e. devices for both short-circuit current protection of cables and overload current protection of cables represent a compromise between inherently incompatible requirements. It is, therefore, a further object of the invention to provide a composite system of protection comprising two separate protective devices, one for short-circuit current protection of cables and the other for overload protection of cables of which each device is best adapted for the single purpose thereof.

Another object of the invention is to provide a protective system for cables comprising two single protective devices of the aforementioned kind wherein both devices are coordinated in such a manner that the short-circuit current protective device limits the short-circuit currents which are allowed to circulate in the cable without, however, having the ability of interrupting relatively low overload currents of excessive duration, whereas the overload current protective device has a time-current interrupting characteristic which closely matches the safe operating temperature characteristic of the protected cable without, however, having the ability of interrupting relatively high fault currents, or currents of short-circuit current proportions.

Heretofore cables were generally protected by fuses, or by circuit breakers with built-in tripping relays. The interrupting characteristics of fuses and circuit breakers applied to cable protection are supposed to closely match the safe operating temperature characteristic of the cable to be protected. However, this object could not be achieved satisfactorily with any prior art fuse or circuit breaker.

The thermal overload relays which are currently used in combination with circuit breakers for protecting cables are either of the direct expansion type, the solder type, or the bimetallic type. The current which flows through the cable to be protected, or a current which is proportional to this current, generates heat in the overload relay which raises the temperature of the thermal tripping element thereof and causes tripping of the circuit breaker into which it is built when the thermal tripping element reaches a predetermined temperature. It is widely believed that it is possible by proper design of the parts of the relay and by providing the necessary heat-storing capacity to closely match the safe operating temperature characteristic of the cable by the tripping characteristic of the relay. In fact, wide margins are generally left in any device of this nature between the tripping characteristic of the relay and the safe operating temperature characteristic of the cable and the cable is generally over-protected in the overload range.

It is, therefore, another object of this invention to provide a protective system permitting to fully utilize the current-carrying ability of a cable close to the margin at which it can safely be operated. Such a protective system tends to preserve continuity of service, overloaded cable circuits being interrupted only when and if failure to interrupt would permanently impair the insulation of the cables, or impair the service for some other reasons. Such an impairment of the service for some other reason is evolution of smoke from a cable without immediately noticeable reduction of the dielectric strength of the insulation of the cable.

One of the reasons for the failure of prior art protective devices—fuses as well as circuit breakers—to achieve a close match of their interrupting characteristic and the safe operating temperature characteristic of the protected cable is due to the fact that the latter was rather undetermined, or has been determined more or less arbitrarily. It appears that the life of the insulation of any cable depends largely on its average temperature and that the former increases as the latter decreases. It is, therefore, possible to greatly increase the life of a cable by limiting its average load. In other instances a relatively high load average with concomitant reduction of the life of the cable may be indicated. Thus the life of the insulation of a cable is generally no unequivocal criterion for establishing a safe operating temperature characteristic to be matched by the interrupting characteristic of any protective device.

The degree of immediate damage to the insulation of a cable by the effects of heat over given periods of time—as distinguished from a long range impairment of its life which is not immediately perceptible—can be determined by standardized methods for measuring the dielectric breakdown and also by cold bend tests. A safe operating temperature characteristic based on immediate damage to the insulation of a cable is a type of curve with which the interrupting characteristic of a protective device might be matched. However, as a general rule, evolution of smoke from the insulation of an overloaded cable may be observed before immediate damage occurs to the insulation. Since smoking of cables cannot be tolerated in most applications as, for instance, power plants, industrial and residential buildings, airplanes, submarines, etc., it became necessary to establish safe operating temperature characteristics of cables by load tests carried to the point at which smoke first appears.

It is, therefore, another object of this invention to provide a protective system for cables which permits, in addition to short-circuit protection, a close match of the overload interrupting characteristic thereof with the safe operating temperature characteristic of a cable as determined by smoke evolution tests.

The safe operating temperature characteristic of a cable seen as the smoking point characteristic thereof is a function of time and of temperature. If the temperature of the current carrying core of the cable is relatively high, smoke evolution starts relatively soon, but if the temperature of the current carrying core of the cable is relatively low, a relatively long period of time may elapse before evolution of smoke from the cable can be observed. In other words, cables have an inverse time-temperature smoking point characteristic.

It is, therefore, another object of the invention to provide a protective system comprising a pair of serially connected coordinated protective devices of which one is responsive to short-circuit currents and the other directly responsive to the temperature of the core of the cable, the latter device including time lag means which enable a close match between the response characteristic of the device and the inverse time-temperature smoking point characteristic of a cable.

Another object of the invention is to provide a system of cable protection having an inherent compensation of ambient temperatures with regard to each protected cable.

It is not possible to design fuses having both, an intense current-limiting action to keep the let-through current well below the available short-circuit current of a cable system which is protected by the fuses, and an overload operating characteristic which matches closely the smoke evolution characteristic of the cable system. It is, therefore, another object of the invention to provide a dual protective system for cables wherein short-circuit current protection is effected by a current-limiting fuse and overload current protection is effected by a separate circuit interrupter arranged in series with the fuse, directly responsive to the temperature of the cable and having an operating characteristic closely matching the smoking point characteristic of the cable.

It is common practice to enclose a plurality of circuit breakers for the protection of a plurality of cable lines in a common enclosure. Each of these circuit breakers is provided with a thermal relay, including a heat generating resistance or heater, for simulating the $I^2 \cdot r$ losses in each cable line. The total amount of heat generated by all the heat generating resistances or heaters of all the circuit breakers which are accommodated in a common enclosure determines the temperature which prevails therein. This temperature is an artificial ambient to which the thermal relays of each circuit breaker accommodated in the common enclosure are subjected. This artificial ambient is often very different from the actual ambients to which each of the various cable lines is subjected. The larger the discrepancy between said artificial ambient and said actual ambients, the farther apart the tripping characteristics of the circuit breakers within the common enclosure from whatever may be deemed the safe operating temperature characteristic of each individual cable.

It is, therefore, another object of the invention to provide a protective system for a plurality of cable lines including a plurality of current-limiting fuses and a plurality of circuit interrupters which system is not subject to operating errors resulting from the mutual thermal effect upon each other of a plurality of thermal tripping devices each associated with a different circuit interrupter and a different cable line.

Further objects and advantages of this invention will become apparent as the following description proceeds and the features of novelty which characterize this invention will be pointed out with particularity in the claims annexed to and forming part of this specification.

For a better understanding of this invention reference may be had to the accompanying drawings in which—

Fig. 1 shows a number of time-current characteristics illustrating the invention;

Fig. 2 shows a typical smoking point characteristic and related characteristics of a cable;

Fig. 3 is a diagrammatic representation of a structure embodying the invention; and Fig. 4 is a section along 4—4 of Fig. 3.

Referring now to Fig. 1, wherein both the abscissae and the ordinates are plotted logarithmically, the time-current characteristic marked insulation damage refers to a given cable and is generally indicative of the load currents which can safely be carried by that cable for given periods of time without any noticeable damage to the insulation thereof. The curve marked approximate smoking point is generally indicative of the load currents which can be carried by the cable for given periods of time without evolution of smoke from the insulating covering of the cable. Evolution of smoke occurs for any given current before noticeable damage is being done to the insulating covering of the cable.

The curve marked interrupting characteristic of prior art cable protective device refers to a prior art device for the protection of the cable whose insulation damage and smoking point characteristic are shown in Fig. 1. There is a range where the prior art cable protective device does not provide any protection against cable damage and this range has been marked accordingly. There is another range where the prior art protective device does not provide any protection against smoking of the cable and this range has been marked accordingly. In still another range there is a loss of inherent current-carrying capacity of the cable due to premature operation of the prior art cable protective device and this range has been marked accordingly in Fig. 1. In the last referred-to range the cable is overprotected to the detriment of continuity of service.

An ideal operating characteristic of a protective device for the cable in hand would closely lie below the smoking point characteristic of the cable and approximately match the latter throughout the cable's overload current range. The curve shown in Fig. 1 marked operating characteristic of cable protector refers to an interrupting device of the type disclosed in the aforementioned patent application Ser. No. 222,658 and used for the purposes of the present invention. The curve shows how close to the ideal the match is between the operating characteristic of the protective device and the smoking point characteristic of the cable.

The protective device whose characteristic is shown in Fig. 1 is a circuit interrupter of the type having a pair of relatively movable or separable contacts normally biased to contact open position and normally held in closed position by a solder joint forming a mechanical tie and a current-carrying bridge between the pair of contacts. If both this circuit interrupter and the cable itself are protected against short-circuit currents by a current-limiting fuse, the circuit interrupter needs but a relatively small interrupting capacity limited to interrupting overload currents of excessive duration.

Fig. 1 indicates the characteristics of two kinds of current-limiting fuses suitable for coordination with a circuit interrupter of the type having relatively movable contacts normally biased to contact open position but locked in closed position by an appropriate solder joint. One of the two characteristics has been marked type A current-limiting fuse and the other characteristic has been marked type B current-limiting fuse. Type A fuses have a relatively lower current carrying capacity and do not operate very fast in the high current range. Type B fuses have an increased current carrying capacity and operate considerably faster in the high current range—above 800 current units—than type A fuses. The cross-over point of the operating characteristic of the circuit interrupter and of the fuse characteristics has been marked by a capital "C." Any fault current less than the abscissa of the cross-over point C is being interrupted by the circuit interrupter; therefore the current-limiting fuses may be designed in such a way as to be unable to interrupt currents less than the abscissa of point C. Such a design can be achieved more readily and at less expense than a design of a current-limiting fuse capable of interrupting currents substantially less than the abscissa of point C in addition to being capable of interrupting currents in excess of the abscissa of point C. Fault currents less than the critical current of cross-over point C will always be interrupted by the circuit interrupter whose characteristic has been marked "operating characteristic of cable protector." The protective device referred to as the cable protector protects the current-limiting fuses which have the characteristic A or B in the relatively low current range wherein the fusible element of these fuses might fuse and intiate an arc which the fuses might be unable to extinguish. Any fault in excess of the critical current of the cross-over point C will be cleared by the operation of one of the current-limiting fuses having the characteristic A or B. The circuit interrupter whose characteristic has been marked "operating characteristic of cable protector" may be designed in such a way as to be able to interrupt low currents only, but unable to interrupt currents of substantially higher value than the critical current of the cross-over point C. Such a design can be achieved more readily and at less expense than a design capable of interrupting currents which are substantially higher than the abscissa of cross-over point C. Currents in excess of the critical current of cross-over point C will always be interrupted by either of the current-limiting fuses having the characteristic A or B. Thus the current-limiting fuses having the characteristic A or B protect the circuit interrupter whose characteristic has been marked "operating characteristic of cable protector" in the current range wherein the contacts of the circuit interrupter might part and draw an arc, but wherein the protector is unable to clear the circuit, i. e. to extinguish the arc and to bring the arc current to zero.

A fuse link of silver or copper having proper dimensions enclosed in a suitable casing and surrounded by a pulverulent quartz filler is, in essence, all that is needed for effecting a current-limiting action to preclude serious damage to an electric system by the effects of heavy short-circuit currents circulating therein. The design and construction of a current-limiting fuse becomes so complex as it generally is if the fuse is not only required to behave and perform in a prescribed manner under heavy short-circuit current condition but, in addition thereto, is also required to behave and perform in a prescribed manner on the occurrence of relatively small overloads of excessive duration. This point may be further illustrated by considering several variables in the design and construction of current-limiting fuses as, for instance, the size of the grain of the arc-extinguishing quartz filler.

A pulverulent quartz filler having a grain size best suited for interrupting heavy short-circuit currents is not best suited for interrupting relatively small overload currents. Wherever a current-limiting fuse is required to interrupt both relatively small overload currents and heavy short-circuit currents the choice of the size of the grain of the pulverulent filler becomes a matter of compromise. Where a fuse is only required to interrupt heavy short circuit currents a pulverulent quartz filler can be selected the grain size of which is best suited for that particular interrupting duty.

The situation is similar with regard to other variables or design factors. The construction of a silver-link quartz-filler current-limiting fuse is relatively simple if overheating of the fuse structure by small overloads of excessive duration is a factor which does not need to be considered, the fuse structure being protected in the overload range by another protective device, such as the same device by which the insulation of the cable is protected. Silver-link quartz-filler current-limiting fuses are generally protected against overheating by small overloads of excessive duration by a solder means which fuses at a relatively low temperature, thereby initiating interrupting of the circuit by the fuse and thus precluding the fuse structure to reach a dangerous temperature. A dangerous temperature is a temperature which some of the materials of which it is made might not be able to withstand, or which might adversely affect other parts arranged adjacent to the fuse structure as, for instance, a contact structure into which the fuse structure is inserted. Solder means of the aforementioned kind may be omitted and the construction of a current-limiting fuse thereby simplified if the fuse is not required to protect itself in the overload range against overheating, this kind of protection being referred to the protective device provided for the protection of the insulation of a cable against overheating. Smoking of a cable occurs sooner and at lower temperatures than those at which a non-self-protected current-limiting fuse may incur damage on account of overloading, and though the temperature of certain parts of a current-limiting fuse may exceed the temperatures of the insulation of a cable arranged in the same circuit and carrying the same current as the fuse yet, nevertheless, interruption of a cable circuit by the insulation protector of the cable prior to smoking of the insulation thereof makes it possible to safely use current-limiting fuses in the circuit which are not self-protected against overloads of excessive duration. Dispensing with the feature of fuse self-protection enables to greatly simplify the design and the construction of a fuse and to reduce the cost thereof.

It is, therefore, apparent that the protection of a cable by a pair of protective devices of which one is a current-limiting fuse and the other a circuit interrupter whose contacts are spring biased to open position and normally held in closed position by a solder joint directly subjected to the temperature of the cable enables to achieve substantial economies in the design and construction of the two protective devices if the devices are protecting each other mutually rather than each being fully self-protected against any kind of fault current which may circulate in the cable. The principle of mutual protection as contrasted with the principle of self-protection has also considerable advantages as far as operating cost and maintenance cost are concerned. If one of the two devices which protect the cable and mutually protect each other is caused to interrupt a fault current and must be replaced thereafter to re-establish the circuit, the device to be replaced may be of a much less expensive design and construction than any fully self-protected structure or unitary device which must be relatively complex and expensive because it must include means enabling it to cope with fault currents over a very wide current range.

Referring now to Fig. 2, the abscissae and the ordinates thereof are both drawn logarithmically, the former indicating time in seconds and the latter temperatures in degree centigrade. There is a narrow band or zone indicative of the range of times at which initiation of smoke evolution from the cable was observed for different current values. The region above the zone of initiation of smoke evolution may be considered as region of deterioration of cable insulation and has been marked accordingly. The time at which oozing started is indicated by a curve marked initiation of oozing.

In cables of relatively large size smoking may occur only after the cable has been disconnected from the source of current. While relatively small wires rapidly give up to their insulating covering the heat generated therein by $I^2 \cdot r$ losses, cables of relatively large size may— on account of the greater ratio of their heat absorbing capacity to the heat absorbing capacity of their insulating covering—cause a delayed evolution of smoke which takes place only after the cables have been disconnected from their source of current. The curve in Fig. 2 marked time limit set by delayed smoke evolution ought to be considered as the safe operating temperature characteristic of the cable wherever the cable is of a nature which may cause delayed evolution of smoke from its insulating covering upon opening of the circuit.

It will be observed from Fig. 2 that the right side of the smoke initiation curve and of the delayed smoke evolution curve are almost parallel to the axis of abscissae. Thus the curves determine the temperature which, if maintained permanently or continuously, would cause smoking and/or damage to the insulating material of which the covering of the cable is made. The maximum continuous current of a specified cable is the highest current which can be carried by it continuously without evidence of smoke or deterioration of its insulating covering, and if a cable is carrying its maximum continuous current for some time its temperature tends to approach but does not reach the above referred to critical temperature.

The ultimate trip of a circuit interrupter is defined to be the minimum current which causes tripping of the interrupter under a set of predetermined conditions. The ultimate trip should slightly exceed the maximum continuous current of a cable, and the higher the overcurrent in the cable above the maximum continuous current, the sooner tripping of the circuit interrupter ought to take place. In other words, the operating characteristic of an ideal thermal circuit interrupter for a cable circuit ought to match closely the smoking point characteristics of the cable which it is called to protect and the circuit interrupter is not supposed to effect interruption of a cable circuit at any fixed temperature of the cable.

Referring now to Figs. 3 and 4, reference numeral X has been applied to generally indicate a high current carrying capacity current-limiting fuse and reference numeral Y has been applied to generally indicate a thermally responsive circuit interrupter of the type comprising a pair of separable contacts normally biased to contact open position and normally held in contact closed position by means of a low melting point solder joint. The current-limiting fuse X may be of the type disclosed in the copending patent aplication of Frederick J. Kozacka, Serial Number 321,599, filed November 20, 1952, for High Current Carrying Capacity Current-Limiting Fuses now U. S. Patent 2,658,974 and the thermally responsive circuit interrupter Y may be of the type disclosed in the aforementioned copending patent application Serial Number 222,658.

The current-limiting fuse X comprises a pair of spaced terminal elements $a$ preferably made of copper and held in spaced position by a coaxial column $b$. Terminal elements $a$ are conductively interconnected by ribbon type fuse links $c$ preferably made of silver or copper to obtain a high current-limiting action. All links $c$ are connected in parallel into an electric circuit and each link provided with a plurality of substantially equidistant portions of reduced cross-section. This feature results in the formation of multibreaks on interruption of short-circuit currents and tends to limit the let-through current which flows in the circuit. Links $c$ are arranged in groups of four in a common plane and the common planes of such link groups are angularly displaced, as more clearly shown in the above referred to copending patent application Serial Number 321,599. The interstices between the fuse links $c$ are filled with a pulverulent arc-quenching filler $d$, preferably pure quartz sand. Links $c$ and filler $d$ are enclosed in a cylindrical insulating shell $e$ arranged coaxially with respect to terminal elements $a$ and secured to them by means of transverse pins $f$. A cap $g$ of sheet metal is arranged at each end of fuse X and engages one of the terminal elements $a$ thereof as well as its insulating shell $e$. Each terminal element $a$ is provided with a coaxial extension or connector stud $a'$ of relatively smaller diameter adapted to cooperate with a tubular connector $k$.

The protective device Y comprises a tubular housing 1 made of an insulating material having a considerable mechanical strength. Cylindrical metallic extensions or connector studs 2 adapted to cooperate with tubular connectors $k$ project in opposite directions from housing 1. The left hand extension or connector stud 2 is secured to, or forms part of, a cylindrical metal body 3a of relatively considerable mass adapted to close housing 1 at the left side thereof. The right hand extension or connector stud 2 is secured to a similar cylindrical metal body 3b of relatively considerable mass adapted to close housing 1 at the right side thereof. The metallic sub-housing 4 is coaxially arranged within housing 1 and is supported by the metal body or terminal header 3a whose inner face is recessed for receiving an end of sub-housing 4. A pulverulent arc-quenching filler 5 is arranged within housing 1 outside of the metallic cylindrical sub-housing 4. A helical biasing spring 6 arranged within sub-housing 4 tends to move a contact member 7 from the position shown in Fig. 3 to the left. Sub-housing 4 and contact member 7 are conductively interconnected by a low melting point solder joint 8. The cylindrical metal body 3b on the right side of the protective device Y is recessed for receiving a stationary contact member 9 cooperating with contact member 7. The contact member 9 has in turn a recess 9a into which the aforementioned contact member 7 projects. Contact members 7 and 9 are conductively interconnected by a low melting point solder joint 10.

Upon sufficient heating of the solder joints 8 and 10 by heat conducted to them, the solder joints yield to the action of the biasing spring 6, resulting in separation of contacts 7 and 9. The arc thus formed is effectively cooled and de-ionized by the pulverulent arc-quenching filler 5 flowing under the action of gravity into the arc gap formed between contact members 7 and 9. Since the metal vapors evolved from the solder joint have a relatively low ionization potential it may be desirable to provide additional arc-extinguishing means which are more effective than the pulverulent filler 5 in and of itself. To provide for more effective arc-quenching, sub-housing 4 and contact 9 may be interconnected by a plurality of fusible elements or links 11 which are arranged in a substantially circular pattern around the longitudinal axis of housing 1 and are embedded in filler 5. The fusible elements or links 11 may be made of a metal the vapors of which have a considerable dielectric strength at the boiling temperature of the metal as, for instance, silver. As a general rule, provision of elements 11 is not absolutely necessary to effect rapid arc extinction.

If the elements 11 are added to the structure, the gap formed upon separation of contact plunger 7 from its cooperating contact member 9 is shunted by the fusible elements or links 11 which draw all the current from the gap, thus tending to prevent formation of an arc across the gap. Owing to the fact that links 11 are carrying virtually all the current upon formation of a gap or break between contact members 7 and 9, links 11 will rapidly fuse upon separation of contact members 7 and 9. Since the ratio of the current carried per link 11 to the active surface of the link-surrounding pulverulent arc-quenching filler 5 is very favorable to rapid arc-extinction, the arcing time and the arc energy can readily be kept within in acceptable limits and the pressure within housing 1 does never rise beyond the limits of the mechanical strength thereof.

The coaxial connecting extensions or connector studs 2 of protective device Y are inserted into a pair of tubular connectors $k$ of which one is arranged at each side of device Y. The tubular connectors shown in Fig. 3 are only diagrammatic representations of tubular connector structures actually used. Actually connectors $k$ must be more massive to have the required current-carrying capacity.

Cable length 20 is stripped of its insulating covering at the left end thereof and its bare core 21 is inserted into the tubular connector $k$ situated at the right of protective device Y. Cable length 22 is stripped of its insulating covering 22' at the right end thereof and its bare core 23 is inserted into the tubular connector $k$ situated at the left of protective device X. The representation of cables 20 and 22 is diagrammatical, the sizes of their cores 21 and 23 being actually smaller and the diameter of their insulating coverings 20' and 22' being actually larger than shown in Fig. 3. A relatively short length of cable 24 is arranged between the protective devices X and Y to thermally insulate protective device Y from the heat generated in the current-limiting fuse X. Generation of a fair amount of heat on account of $I^2 \cdot r$ losses is a feature inherent in current-limiting fuses and the purpose of the length of cable 24 between devices X and Y is to preclude any effects upon the operating characteristic of device Y by the heat generated in the current-limiting fuse X.

The current-limiting fuse X is enclosed in a rubber shoe 25 and in a similar fashion the protective device Y is enclosed in a rubber shoe 26. The space outside of fuse X within rubber shoe 25 may be filled with a suitable compound 27 and the space within rubber shoe 26 outside of housing 1 of protective device Y may be filled with a suitable compound 28. The narrow axially outer ends of rubber shoes 25 and 26 engage the cable lengths 22, 24 and 24, 21, respectively, and the ends of rubber shoes 25 and 26 which engage the above lengths of cable are surrounded by an appropriate number of windings of insulating tape 29.

The structure of protective device Y is in close heat exchanging relation to the core 21 of the length of cable 20 and has thermal parameters balanced to assimilate its response or yielding point characteristic to the smoking point characteristic of the covering of the length of cable 20. The arrangement is made in such a way that the $I^2 \cdot r$ losses in the core 21 of the cable 20 is virtually the only source of heat to the thermal effect of which protective device Y is subjected, i. e. while protective device Y is subjected to the thermal effects of ambients in the same way as the cable 20 is, any extrinsic source of heat as, for instance, fuse X is precluded from thermally affecting protective device Y.

While protective device Y is operative in response to a fixed temperature, that fixed temperature is reached by the low melting point solder joints 8, 10 of the device within different periods of time, depending upon the temperature of the core 21 of the cable 20. If the temperature of the core 21 is relatively low, a relatively long time will elapse until the solder joints 8, 10 of device Y reach the fixed temperature at which the device becomes operative. However, if the temperature of core 21 is relatively high, a relatively short time will elapse until solder joints 8, 10 reach the fixed temperature at which device Y becomes operative. Thus the heat exchange structure or mass arranged between the core 21 of the cable 20 and solder joints 8, 10 of device Y converts the operating characteristic of device Y into an inverse time-temperature characteristic of the type required for assimilating the operating characteristic of device Y to the smoking point characteristic of cable 20. The above referred to heat exchange structure of device Y includes all parts which form the current path thereof, i. e. parts 2, 3a, 4, 8, 7, 10, 9, 3b, 2. The ohmic resistance of these parts is of the same order as that of a piece of cable 20 of equal length as protective device Y to keep the $I^2 \cdot r$ losses in protective device Y within the same order as the $I^2 \cdot r$ losses in a piece of cable 20 having the same length as device Y.

Considering a thin slab of a heat conducting material as, for instance, aluminum or copper, having a thickness of $d$ centimeters, an area of face of A square centimeters, the temperature of the rear face being $\theta_1$ centigrades and that of the front face $\theta_2$ centigrades, with $\theta_2 > \theta_1$ and assuming $\theta_1$ and $\theta_2$ to be maintained constant, then the total heat Q transported is given by $$Q = \frac{k \cdot A (\theta_2 - \theta_1) \cdot t}{d} \text{ (cal.)} \qquad (1)$$

$$k = \frac{Q}{t \cdot \frac{\theta_2 - \theta_1}{d} \cdot A} \text{ (cal./cm. sec. deg. C.)} \qquad (2)$$

$$\theta = \theta_0 + (\theta_m - \theta_0)(1 - e^{-t/k}) \qquad (3)$$

where $k$ is the coefficient of thermal conductivity, Q the number of calories transferred, $t$ the time in seconds, and $$\frac{\theta_2 - \theta_1}{d}$$

the temperature gradiant. The coefficient of thermal conductivity expressed in terms of cal./cm. sec. deg. C. is .480 for aluminum and .918 for copper. The thermal parameters of the slab under consideration are the coefficient of thermal conductivity $k$ which depends on the nature of the material of which the slab is made, its surface area A, and its thickness $d$.

The term thermal parameters, as used with reference to the heat exchange structure for transferring heat from the core of the cable to the solder joints 8 and 10 of the protective device Y, indicates, in addition to the above quantities, a factor which depends upon the geometrical configuration of the structure and upon convection from the structure to the circumambient medium.

Equations 1 and 2 do not apply to the heating of the structure of device Y by the core of cable 20, since the latter heating process is not one wherein the temperature gradient is maintained constant. Reference to these two equations was made for giving a simple explanation of the term thermal parameter.

The heating curve of a cable for any given current is defined by the equation:

$$\theta = \theta_0 + (\theta_m - \theta_0)(1 - e^{-t/K}) \qquad (3)$$

where
$\theta$ = conductor temperature at any time $t$
$\theta_0$ = initial conductor temperature at a time $t = 0$
$\theta_m$ = max. temperature conductor will reach if current is held constant until thermal equilibrium is reached
$K$ = constant of cable which depends upon the cable construction and the installation conditions.

The following table gives approximate values for K in hours.

|  | Cable in Air | Cable in Ducts Underground | Cable Buried in the Ground |
|---|---|---|---|
| Small Sizes | ½ | 1 | 1¼ |
| Intermediate Sizes | 1 | 2-2½ | 3 |
| Large Sizes | 1½ | 4 | 6 |

It appears from Equation 3 that the heating of a cable is governed by an exponential equation. Under thermal equilibrium conditions the temperature of the solder joints 8 and 10 of device Y is equal to the temperature of the core 21 of the cable 20 as defined by Equation 3. Upon rise of the temperature of the cable 20 the temperature of the solder joints 8 and 10 of device Y rises equally but with a time lag which depends (a) upon the temperature of cable 20 or the temperature gradient between cable 20 and solder joints 8 and 10, respectively, and (b) upon the thermal parameters of the device Y. The rise in temperature of solder joints 8 and 10 of device Y may be described mathematically by an exponential function lagging the exponential function which describes the rise in temperature of the core 21 of the cable 20. It is this time lag and the possibility of its control by modifying the thermal parameters of the protective device Y which permits to closely assimilate the operating characteristic of the protective device Y to the smoking point characteristic of the covering of cable 20.

The proper balance of the thermal parameters of the protective device Y to achieve a close assimilation of the characteristic of that device to the smoking point characteristic of the cable must be found empirically for each different type of cable with due regard to the installation conditions thereof. I have found that the required assimilation of the characteristic of device Y to the smoking point characteristic of a copper power cable calls generally for a local increase of heat absorbing capacity in the order of 2½ times, or more, of the heat absorbing capacity of an equal length of cable.

The application of two coordinated protective devices of which one is a current-limiting fuse and the other is a spring biased cable insulation protector predicated on the fusion of a low melting point solder directly heated by the $I^2 \cdot r$ losses occurring in the cable and by no other source or sources of heat is particularly desirable where the ends of a cable are readily accessible and where the cable is exposed to widely different ambients resulting in a non-uniform temperature distribution, or a temperature gradient, along the cable. Under such conditions the current-limiting fuse will be arranged immediately adjacent the ends of the cable where they are readily accessible and can be exchanged without difficulty in case of need. The cable insulation protector will be arranged at a point of the cable remote from the current-limiting fuses where the temperature of the cable tends to be highest. This point might not be so easily accessible as the ends of the cable where the current-limiting fuses are located but this point needs only to be serviced in the relatively few instances where the cable circuit has been overloaded to the danger point, thus compelling interruption of the circuit by the cable insulation protector.

It will be understood that I have illustrated and described herein preferred embodiments only of my invention and that various alterations may be made in the details thereof without departing from the spirit and scope of my invention as defined in the appended claims.

I claim:

1. An arrangement for the protection against short-circuit currents and against overloading of electric conductors which are insulated by an organic insulating material comprising an electric circuit, a conductor having a metallic current-carrying core and an organic insulating covering enveloping said core arranged in said circuit, a current-limiting fuse for the protection of said conductor against short-circuit currents also arranged in said circuit, and an additional circuit interrupting device for the protection of said conductor against overloading arranged between sections of said conductor in series with said sections and in series with said current-limiting fuse, said additional circuit interrupting device being directly responsive to the temperature of said core of said conductor and including a pair of separable contacts normally spring-biased to the open position thereof and held in closed position by solder means conductively interconnecting said pair of contacts, the losses in said core of said conductor being virtually the only source of heat controlling the response of said additional circuit interrupting device.

2. An arrangement for the protection against short-circuit currents and against overloading of electric conductors which are insulated by an organic insulating material comprising an electric circuit, a conductor having a metallic current-carrying core and an organic insulating covering enveloping said core arranged in said circuit, a current-limiting fuse for the protection of said conductor against short-circuit currents also arranged in said circuit, and an additional circuit interrupting device for the protection of said conductor against overloading arranged between sections of said conductor in series with said sections and in series with said current-limiting fuse, said additional circuit interrupting device being directly responsive to the temperature of said core of said conductor and operative in response to a fixed temperature slightly less than the temperature assumed by said core of said conductor when continuously carrying the minimum current causing smoking of said conductor, said additional circuit interrupting device including a pair of separable contacts normally spring-biased to the open position thereof and held in closed position by solder means conductively interconnecting said pair of contacts, said additional circuit interrupting device further including a time-lag structure for assimilating the response characteristic thereof to the smoking characteristic of said covering of said conductor, the losses in said core of said conductor being virtually the only source of heat controlling the response of said additional circuit interrupting device.

3. An arrangement for the protection against short-circuit currents and against overloading of electric conductors which are insulated by an organic insulating material comprising an electric circuit, a conductor having a metallic current-carrying core and an organic insulating covering enveloping said core arranged in said circuit, a current-limiting fuse of the silver-link-quart-filler type arranged in said circuit for the protection of said conductor against short-circuit currents, and an additional circuit interrupting device for the protection of said conductor against overloading arranged between sections of said conductor in series with said sections and in series with said current-limiting fuse, said additional circuit interrupting device including a pair of separable contacts normally spring-biased to the open position thereof and held in closed position by a low fusing point metal conductively interconnecting said pair of contacts, the yielding point of said low fusing point metal being slightly less than the temperature of said core of said conductor when continuously carrying the minimum current causing smoking of said covering of said conductor, said additional circuit interrupting device further having a current path of sufficient conductivity and thermal capacity to cause the temperature thereof never to exceed the temperature of said sections of said conductor between which said additional circuit interrupting device is arranged, said current path of said additional circuit interrupting device having sufficient mass to assimilate the yielding characteristic of said low fusing point metal to the smoking characteristic of said covering of said conductor.

4. An arrangement for the protection against short-circuit currents and against overloading of electric conductors which are insulated by an organic insulating material comprising an electric circuit, a conductor having a metallic current carrying core and an organic insulating covering enveloping said core arranged in said circuit, a current-limiting fuse having a plurality of fuse links arranged in parallel in said circuit, each of said plurality of fuse links being provided with a plurality of substantially equidistant portions of reduced cross-section to limit the let-through current flowing in said circuit, an additional interrupting device arranged in said circuit in series with said conductor and said current-limiting fuse and in spaced relation from said current-limiting fuse, said additional interrupting device comprising a pair of contacts normally conductively connected to each other by a mass of solder and separable from each other upon fusion of said mass of solder and means for separating said pair of contacts upon fusion of said mass of solder, the path of the current in said additional interrupting device having an ohmic resistance in the order of and not substantially exceeding the ohmic resistance of an equal length of said conductor, and the spacing between said current-limiting fuse and said additional interrupting device being sufficiently large to preclude any substantial heating of said mass of solder by the heat generated in said current-limiting fuse.

5. An arrangement for the protection against short-circuit currents and against overloading of electric conductors which are insulated by an organic insulating material comprising a conductor having a metallic core and an organic covering enveloping said core, a first protective device in the nature of a current-limiting fuse and a second protective device having a considerably smaller interrupting capacity than said first protective device serially arranged between sections of said conductor, a first housing accommodating said first protective device, said first protective device including only means for interrupting currents of short-circuit current proportions and lacking means for protecting said covering of said conductor against excessive heat resulting from overloading of said conductor, a second housing arranged in spaced relation with respect to said first housing and accommodating said second protective device, said second protective device comprising a pair of separable contacts normally spring biased to the open position thereof and held in closed position by a solder joint conductively interconnecting said pair of contacts, the yielding point of said solder joint being a fixed temperature slightly in excess of the temperature assumed by said core of said conductor when said conductor is continuously carrying the maximum continuous current thereof, said second protective device further including a heat conducting and heat absorbing structure arranged in physical contact with said core of said conductor and with said solder joint to assimilate the yielding characteristic of said solder joint to the smoking characteristic of said covering, and said core being practically the only source of heat controlling yielding of said solder joint.

6. An arrangement for the protection against overloading and against short-circuit currents of electric conductors which are insulated by an organic insulating material comprising an electric circuit, a conductor having a metallic core and an organic covering enveloping said core arranged in said circuit, said covering being removed from said conductor along a relatively short length thereof, a clamp connector engaging said core of said conductor at the point of said conductor where said covering is removed therefrom, a thermally responsive switching device including a pair of separable contacts normally spring-biased to the open position thereof and held in closed position by a solder joint conductively interconnecting said pair of contacts, the yielding point of said solder joint being a fixed temperature slightly less than the temperature assumed by said core of said conductor when carrying the minimum current causing smoking of said covering for an extended period of time, said switching device further including a heat conducting and heat absorbing structure arranged in physical contact with said clamp connector and with said solder joint to assimilate the yielding characteristic of said solder joint to the smoking characteristic of said covering, said core of said conductor being practically the only source of heat controlling yielding of said solder joint, and a current-limiting fuse serially arranged in said circuit with said switching device a sufficient distance therefrom to preclude any substantial effects on the yielding characteristic of said solder joint by heat generated in said current-limiting fuse.

7. An arrangement for the protection against short-circuit currents and against overloading of electric conductors which are insulated by an organic insulating material comprising an electric circuit, a conductor having a metallic current-carrying core and an organic covering enveloping said core arranged in said circuit, a pair of protective devices serially arranged in said circuit, said pair of protective devices including a current-limiting fuse designed to limit and to interrupt high currents in the nature of short-circuit currents and to be inherently incapable of interrupting currents in the low overload range of said conductor, said pair of protective devices further including a circuit interrupter arranged between sections of said conductor and designed to have an interrupting ability limited to the overload range of said conductor and to be inherently incapable of interrupting high currents in the nature of short-circuit currents, said circuit interrupter comprising a pair of separable contacts normally spring-biased to the open position thereof and held in closed position by low fusing point solder means conductively interconnecting said pair of contacts, the yielding point of said solder means being a fixed temperature slightly in excess of the temperature assumed by said core of said conductor when continuously carrying the maximum continuous current thereof, the ohmic resistance of the current path of said circuit interrupter being so low as to make said conductor practically the only source of heat controlling yielding of said solder means and the current path of said circuit interrupter having a sufficiently high heat absorbing and heat dissipating capacity to produce at rising currents a substantial time lag between the temperature of said core of said conductor and the temperature of said solder means to assimilate the yielding characteristic of said solder means to the smoking characteristic of said covering of said conductor.

8. An arrangement for the protection against short-circuit currents and against overloading of electric conductors which are insulated by an organic insulating material comprising an electric circuit, a first conductor arranged in said circuit, a current-limiting fuse connected with one terminal thereof to one end of said first conductor, a thermal protector comprising a pair of separable contacts normally spring-biased to the open position thereof and held in closed position by solder means conductively interconnecting said pair of contacts, a second conductor of relatively short length establishing an electric series connection between said current-limiting fuse and said thermal protector, the heat dissipating ability of said second conductor being sufficiently high to preclude any substantial heating of said solder means of said thermal protector by the heat generated in said current-limiting fuse, and a third conductor of relatively considerable length having a metallic current-carrying core and an insulating covering enveloping said core conductively connected to said thermal protector, the losses in said third conductor being virtually the only extrinsic source of heat controlling the response of said thermal protector.

References Cited in the file of this patent
UNITED STATES PATENTS

| | | |
|---|---|---|
| 2,056,040 | Dozler | Sept. 29, 1936 |
| 2,246,324 | Schroder | June 17, 1941 |
| 2,645,690 | Edsall | July 14, 1953 |

FOREIGN PATENTS

| | | |
|---|---|---|
| 298,375 | Germany | June 16, 1917 |